United States Patent
Gomez

(10) Patent No.: US 11,723,351 B1
(45) Date of Patent: Aug. 15, 2023

(54) FISHING LURE WITH OPTIC FIBER SIMULATOR

(71) Applicant: Nestor Gomez, Miami, FL (US)

(72) Inventor: Nestor Gomez, Miami, FL (US)

(*) Notice: Subject to any disclaimer, the term of this patent is extended or adjusted under 35 U.S.C. 154(b) by 0 days.

(21) Appl. No.: 17/590,523

(22) Filed: Feb. 1, 2022

(51) Int. Cl.
*A01K 85/01* (2006.01)

(52) U.S. Cl.
CPC .................. *A01K 85/015* (2022.02)

(58) Field of Classification Search
CPC ...... A01K 85/015; A01K 85/01; A01K 85/00; A01K 85/1821; A01K 85/1823; A01K 85/1851; A01K 85/1853; A01K 85/029
USPC ................ 43/17.6, 17.5, 42.28, 42.36, 42.09
See application file for complete search history.

(56) References Cited

U.S. PATENT DOCUMENTS

| | | | | |
|---|---|---|---|---|
| 3,824,731 | A * | 7/1974 | Sandschaper | A01K 75/02 43/17 |
| 4,347,681 | A * | 9/1982 | Fima | A01K 85/01 43/17.6 |
| 4,697,374 | A * | 10/1987 | Simms | A01K 97/00 43/17.1 |
| 4,741,120 | A * | 5/1988 | Cota | A01K 85/01 43/17.5 |
| 4,819,361 | A | 4/1989 | Boharski | |
| 4,888,905 | A * | 12/1989 | Garr | A01K 85/01 43/42.34 |
| 5,070,437 | A * | 12/1991 | Roberts, Sr. | F21L 4/00 362/396 |
| D326,892 | S * | 6/1992 | Acevedo | D22/128 |
| 5,172,510 | A * | 12/1992 | Lovell, Jr. | A01K 85/01 43/42.36 |
| 6,546,666 | B2 * | 4/2003 | Schultz | A01K 85/01 43/42.47 |
| 6,581,319 | B2 * | 6/2003 | West | A01K 85/01 43/42.31 |
| 7,707,764 | B1 * | 5/2010 | Osburn | A01K 85/01 43/17.5 |
| 8,402,686 | B1 * | 3/2013 | Osburn, III | A01K 85/01 43/17.5 |
| 8,533,990 | B2 * | 9/2013 | Aanenson | A01K 85/00 43/17.6 |
| 9,445,583 | B1 * | 9/2016 | Aanenson | A01K 85/01 |
| 2003/0182841 | A1 * | 10/2003 | Calak, Jr. | A01K 85/01 43/17.6 |
| 2004/0200122 | A1 * | 10/2004 | Aanenson | A01K 85/01 43/17.6 |

(Continued)

OTHER PUBLICATIONS

LED Optics Explained LED Supply (https://www.ledsupply.com/blog/led-optics-explained/) (Year: 2016).*

*Primary Examiner* — Philip J Bonzell
*Assistant Examiner* — Maria E Graber
(74) *Attorney, Agent, or Firm* — Sanchelima & Associates, P.A.; Christian Sanchelima; Jesus Sanchelima

(57) ABSTRACT

A fishing lure with optic fiber simulator for simulating the bioluminescence characteristics of sea animals typically used as bait. A housing (20) partially receiving a fiber optic casing (60) with a battery with switch assembly (40) and connected light source (50) emits light to fiber optic members (80) with photophore elements. A hook assembly (90) is hidden inside the optic members and skirt strap members. An alternate embodiment uses a cable gland to hold the fiber optic members (180) and hook assembly (190).

4 Claims, 3 Drawing Sheets

(56) References Cited

U.S. PATENT DOCUMENTS

| | | | |
|---|---|---|---|
| 2008/0196291 A1* | 8/2008 | Gelber | A01K 91/06 43/17.6 |
| 2013/0074395 A1* | 3/2013 | Farr, Jr. | A01K 85/01 43/42.31 |

* cited by examiner

FISHING LURE WITH OPTIC FIBER SIMULATOR

BACKGROUND OF THE INVENTION

1. Field of the Invention

The present invention relates to fishing lures and, more particularly, to fishing lures with optic fiber simulators.

2. Description of the Related Art

Several designs for fishing lures have been designed in the past. None of them, however, include optic fiber simulator as claimed herein.

Applicant believes that a related reference corresponds to U.S. Pat. No. 4,819,361 issued to Boharski for Fishing Lure. However, it differs from the present invention because the reference does not teach the use of fiber optic elements with imperfections to disseminate the light from a luminous source. Some animals have bioluminescence characteristics such as the glowing fluorescent squids. These are used for bait in deep sea fishing. A lure that mimics the photophores in the animals is quite desirable to attract the fish sought by the fishermen.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a fishing lure with an electric optic fiber simulator.

It is another object of this invention to provide such a fishing lure that mimics the chromatophore characteristics of sea animals that are used as bait in deep sea fishing.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
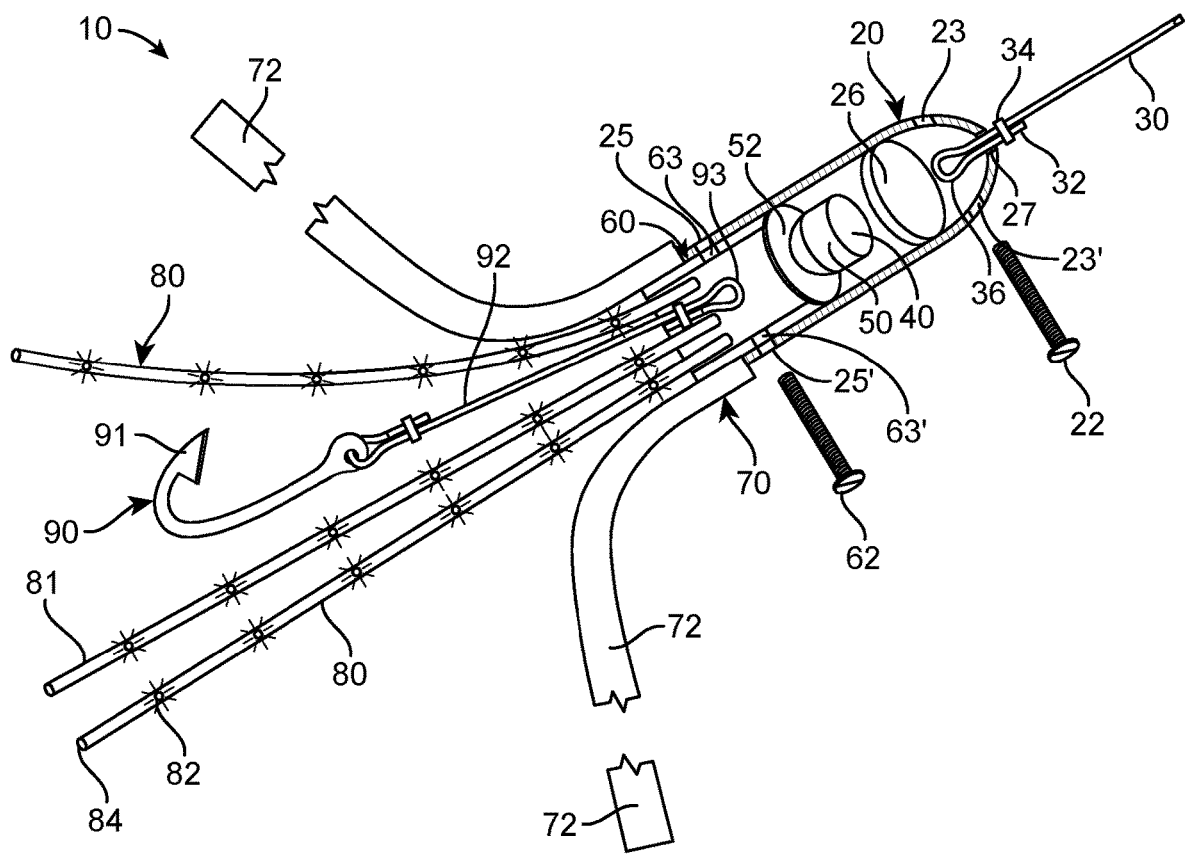
FIG. 1 represents a side view of one of the embodiments of the invention with a partial cross-section of housing 20 and fiber optic casing 60.

Referring now to the drawings, where the present invention is generally referred to with numeral 10, it can be observed that it basically includes housing 20, line assembly 30, battery with switch assembly 40, light source 50, fiber optic casing 60, skirt assembly 70, fiber optic members 80 and hook member 90.

Housing 20 has a substantially cylindrical shape with two ends. One end with a convex wall that receives said line assembly 30 through opening 27 and the other end is open. Holes 23 and 23' are aligned to permit an elongated member 22, such as a bolt, pass through and also through loop 36 of line assembly 30. In one of the preferred embodiments line end 32 is folded back to define loop 36 and kept in place with securing stop 34. Other equivalent means can also be used to create a detachable mechanism between line assembly 30 and housing 20. Inside housing 20, at a predetermined distance away from the convex end, a sealing wall 26 is mounted in a watertight disposition.

Fiber optic casing 60 has a substantially cylindrical shape with two ends. Mounted to one of the ends is a transparent lens 52 with a cooperative diameter to fit snuggly in a watertight disposition through the open end of housing 20. Adjacent to the transparent lens 52, and opposite to casing 60, there is a light source, for example an LED light, that is mounted thereon and connected to a battery assembly with a switch 40 to selectively activate the light source.

Holes 63 and 63' are aligned with themselves and also with holes 25 and 25' in housing 20 to permit elongated member 62, such as a bolt, to pass through and also through loop 93 of hook assembly 90. In this manner, any pulling force from hook assembly 90 will be transmitted to housing 20 and line assembly 30.

Skirt assembly 70 extends longitudinally outwardly a predetermine distance from the other end of optic casing 60. Skirt assembly 70 includes several skirt straps that are preferably mounted around the outer surface of optic casing 60 and partially covering fiber optic assembly 80. Fiber optic assembly 80 includes several fiber optic members 81 that extend, in the preferred embodiment beyond strap members 72. Fiber optic members 81 include several cuts 82 (or imperfections) that leak out light. These cuts act as photophore elements, and are created on standard fiber optic to allow light leakages at predetermined distances along fiber optic members 81. One way of creating these imperfections Fiber optic ends 84 also emit light can be seen from the outside. The overall effect is to mimic the bioluminescence characteristics of animals.

Hook assembly 90 includes line 92 that extends beyond strap members 72 but not beyond fiber optic member 81 in the preferred embodiment. Hook member 91 stays hidden, in one of the preferred embodiments, within fiber optic members 81. Strap members 72 include a skirt assembly end attached to a bottom portion of the housing 20.

Figure 2:
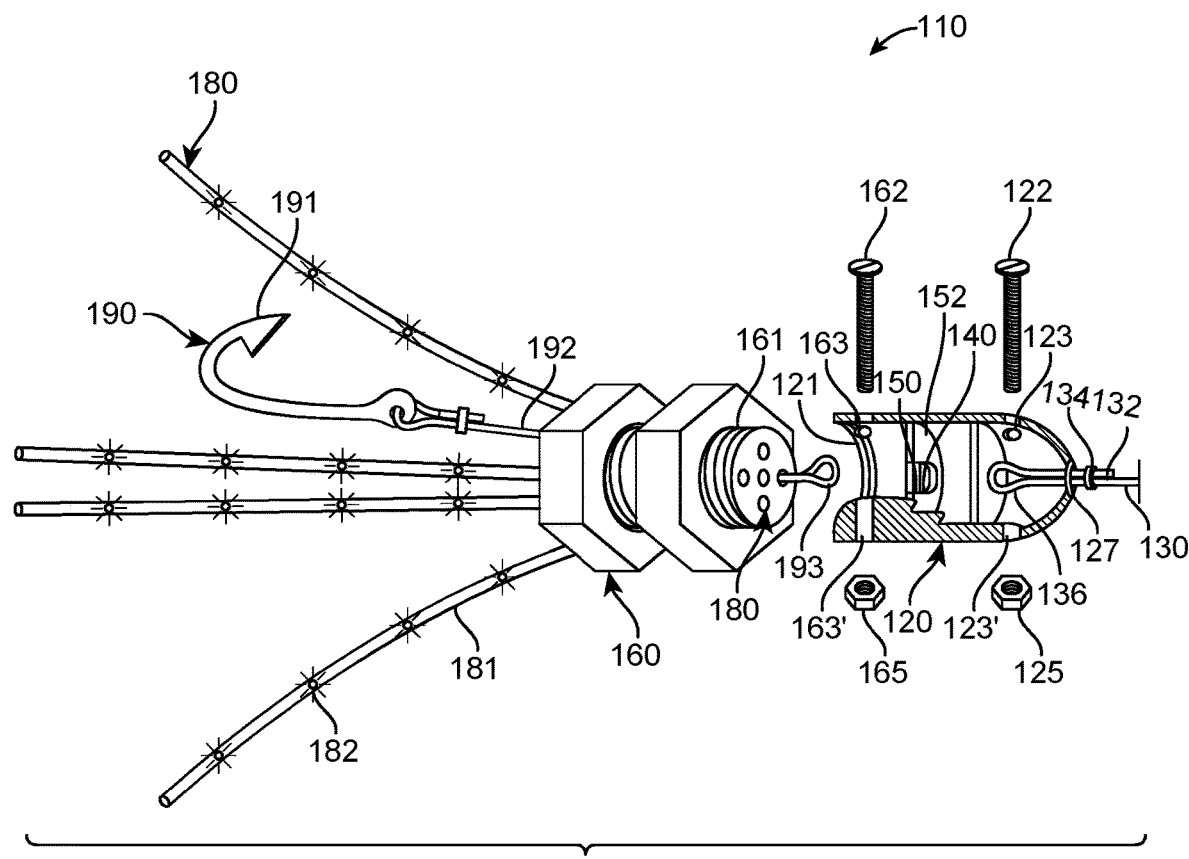
FIG. 2 represents an inclined isometric view of one of an alternate embodiment of the invention with a partial cross-section of housing 120 and fiber optic casing 160 using a dome cap cable gland with lock nut 160.
Figure 3:
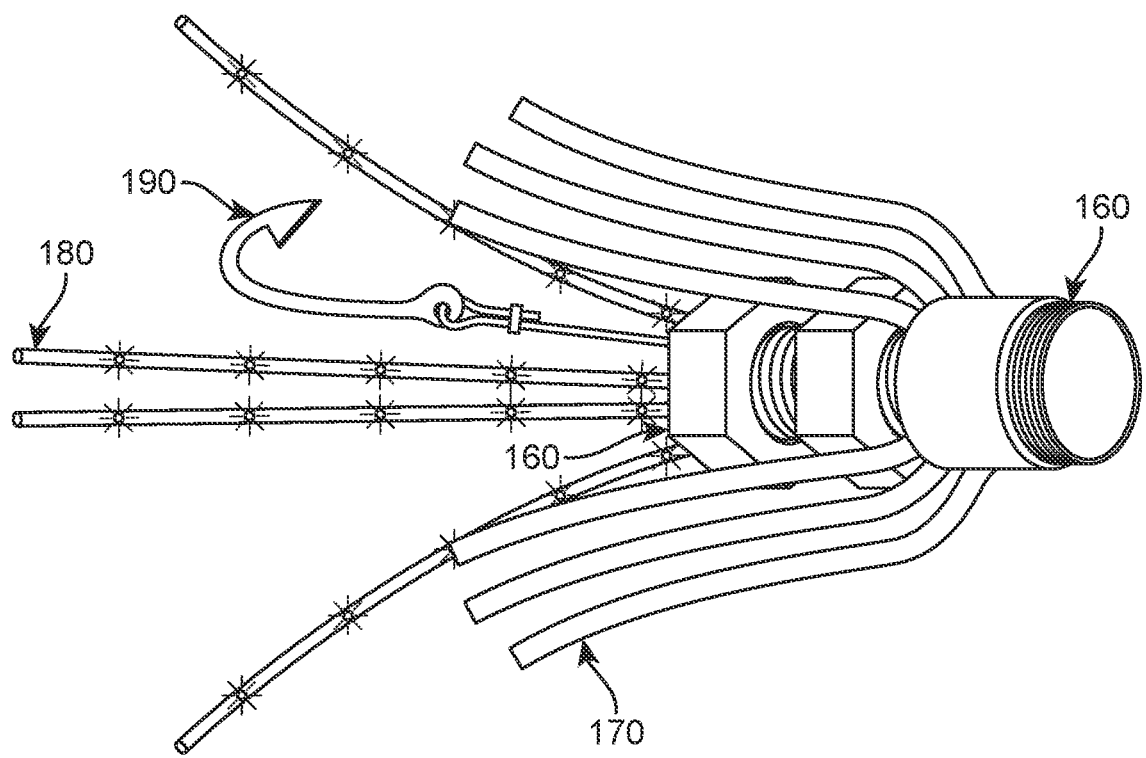
FIG. 3 represents an inclined view of one of the alternate embodiment in FIG. 2 with fiber optic casing 160 partially covered with skirt assembly 170.

An alternative embodiment, as shown in FIGS. 2 and 3, is generally referred to with numeral 110, can be observed that it basically includes housing 120, line assembly 130, battery with switch assembly 140, light source 150, fiber optic casing 160, fiber optic members 180 and hook member 190.

In this alternate embodiment, fiber optic assembly 160 is implemented with a dome cap cable gland with lock nut, such as those manufactured by ElectDirect.com under SKU RDC29NA and commonly used to provide a good grip on cables. This grip, however, would not be enough to withstand the pulling force of a large fish. Thus, bolts 122 and 162 with their respective nuts 125 and 165 are used to keep hook member 190 attached since the former pass through openings 123; 123'; 163 and 163', respectively, and through loop 136 and 193, respectively. There is also a mating threaded engagement between 120 and casing 160 through internal thread 121 and external thread 161, respectively. As it can be best seen in FIG. 2, fiber optic members 180 protrude slightly through and loop 193 protrudes even more to cooperate with through openings 163 and 163' to permit bolt 162 to pass through. Housing 120 has a substantially cylindrical shape with two ends One end of housing 120 includes and opening 127 that receives said line assembly 130 therethrough.

In FIG. 2, skirt assembly 170 was removed to appreciate the structural details of fiber optic assembly 160. In FIG. 3, an embodiment for skirt assembly 170 is mounted onto assembly 160 to partially cover hook assembly 190. In a suitable embodiment, line end 132 is folded back to define loop 136 and kept in place with securing stop 134. In a preferred embodiment, housing 120 has a substantially cylindrical shape with two ends mounted to one of the ends is a transparent lens 152 with a cooperative diameter to fit snuggly in a watertight disposition through the open end of housing 120.

Fiber optic assembly 180 includes several fiber optic members 181 that extend, in the preferred embodiment beyond fiber optic casing 160. Fiber optic members 181 include several cuts 182 that leak out light emitted from light source 150.

Hook assembly 190 includes line 192 that extends beyond fiber optic casing 160 but not beyond fiber optic member 181 in the preferred embodiment. Hook member 191 stays hidden, in one of the preferred embodiments, within fiber optic members 181.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A fishing lure with optic fiber simulator, comprising:
A) a housing (120) having a substantially cylindrical shape with first and second ends, said first end being closed except for a through opening (127) and said second end having an internal thread;
B) a fishing line (130) passing through said through opening (127) in said first end;
C) a fiber optic casing (160) having a dome cap cable gland with a lock nut including third and fourth ends, said third end having an external thread capable of being coupled to said internal thread, said fiber optic casing includes a transparent lens (152) mounted to said third end and further mounted on a light source (150), said fiber optic casing further includes a switched battery assembly (140) to selectively activate said light source (150);
D) a skirt assembly (170) including a plurality of straps (172) having fifth and sixth ends, said fifth ends mounted to the outer surface of said casing (160) substantially adjacent to said fourth end;
E) a fiber optic assembly (180) having a plurality of fiber optic members (181) having seventh and eighth ends, said seventh ends being mounted to said fourth ends and extending inside said straps (172) a predetermined distance beyond said straps (172), and said fiber optic members (181) including at least one photophore element (182); and
F) a hook assembly (190) having a line (192) with ninth and tenth ends, said ninth end being mounted to said housing (120) and casing (160) assemblies and said tenth end extending beyond said straps (172) and not beyond said fiber optic members (181) and further having a hook member (191).

2. The fishing lure set forth in claim 1, wherein said first end has a convex shape.

3. The fishing lure set forth in claim 2, wherein said fishing line is removably mounted to said first end.

4. The fishing lure set forth in claim 3, wherein said ninth end is removably mounted to said housing (120) and casing (160) assemblies.

* * * * *